United States Patent [19]

Kulikauskas

[11] Patent Number: 4,639,263
[45] Date of Patent: Jan. 27, 1987

[54] GLASSWARE FORMING PRODUCTION MONITOR

[75] Inventor: Joseph A. Kulikauskas, Elmira, N.Y.

[73] Assignee: Emhart Industries, Inc., Farmington, Conn.

[21] Appl. No.: 755,522

[22] Filed: Jul. 16, 1985

[51] Int. Cl.[4] .............................................. C03B 9/44
[52] U.S. Cl. .......................................... 65/158; 65/29; 65/160; 65/163; 364/473; 364/476
[58] Field of Search ................... 65/158, 160, 163, 29; 364/473, 476

[56] References Cited

U.S. PATENT DOCUMENTS

| 3,767,374 | 10/1973 | Iacovazzi et al. | 65/160 X |
| 4,004,904 | 1/1977 | Fergusson | 65/158 |
| 4,457,772 | 7/1984 | Haynes et al. | 65/160 |
| 4,494,656 | 1/1985 | Shay et al. | 65/158 X |

Primary Examiner—Arthur Kellogg
Attorney, Agent, or Firm—Arthur B. Moore; Arthur J. Samodovitz

[57] ABSTRACT

Apparatus for acquiring data from automated ware identification and reject devices in a glassware production line, and for producing operator-formatted reports on ware production and losses. Production data is obtained from a swab ware reject system, which is synchronized with machine section operation, and from a down and stuck ware inspection assembly. These reject assemblies both rely upon a light source-sensor to monitor the procession of containers on a hot end conveyor. A single production monitor can compile data from a plurality of production shops, and produce hardcopy production reports automatically or on command. The production monitor logs data in a plurality of counting memory registers, which are addressed by production category, real time interval, and source mold cavity. The user specifies report formats and data compilation parameters over an input/output device such as a CRT terminal.

3 Claims, 14 Drawing Figures

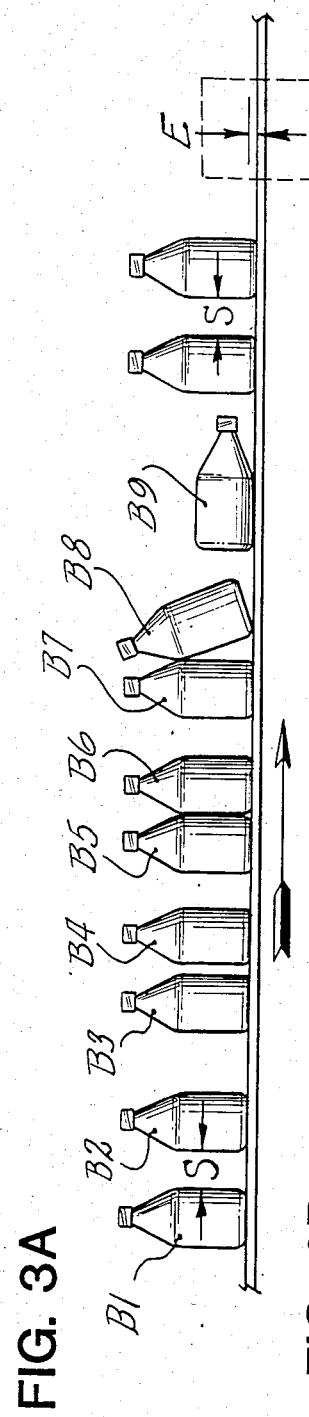
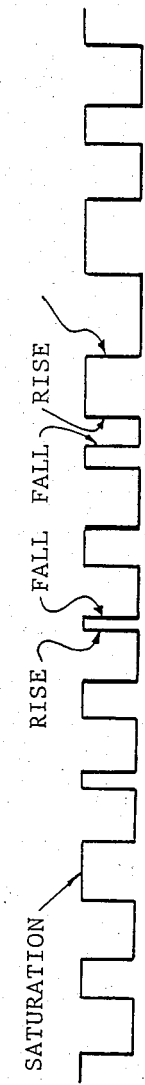
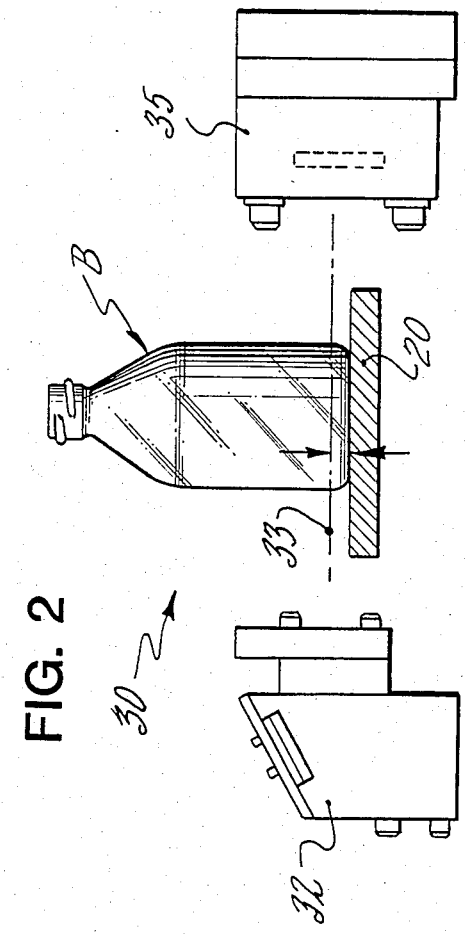
FIG. 3A
FIG. 3B
FIG. 2

DATA BREAKDOWN BY SECTION

MACHINE SUMMARY
SELECTED CATEGORY

GLASSWARE FORMING PRODUCTION MONITOR

BACKGROUND OF THE INVENTION

The present invention relates to automated inspection apparatus for glassware containers production facilities, and more particularly to data processing apparatus for acquiring information from such inspection apparatus and compiling this information for reports to the user.

Modern glass container production facilities increasingly rely upon automated inspection apparatus for quality control, to provide automatic indications of possible machine malfunctions, for inventory, and other purposes. The glassware forming systems comprise a plurality of multisectioned machines known as "I.S. machines", for forming glassware articles from molten glass; a furnace and a forehearth and related apparatus for delivering molten glass to the I.S. machines; a lehr for annealing the glass containers received from the I.S. machines; and testing and inspection devices for ware emerging from the lehr. Such systems are often characterized by distinguishing the "hot end"—i.e. those mechanisms involved in providing the molten glass processing this to form glassware articles, up to and including the lehr, and the "cold end", referring to the post-annealing inspection of ware and the packing of acceptable ware.

The great majority of inspection developments in the glass container manufacturing field have been in the "cold end" area. There are a limited number of devices which monitor the containers being formed prior to the lehr, typically as they travel from the I.S. machine to a lehr-loader. In addition, this stage of the process typically includes some means for rejecting unacceptable ware. Such apparatus is exemplified by U.S. Pat. Nos. 4,332,606 to Gardner and 4,494,656 to Shay et al., both commonly assigned with the present application. U.S. Pat. No. 4,332,606 discloses "swab ware reject" apparatus for identifying glassware articles made in a particular section and mold of a multi-section I.S. machine during particular cycles of operation. This apparatus includes operator-actuated switches for designating one or a series of articles to be rejected following the swabbing of molds. U.S. Pat. No. 4,494,656 discloses apparatus for monitoring the procession of bottles or the like on a moving conveyor, and for automatically identifying, "down", "stuck", or tilted bottles, which may then be rejected. The disclosure of these prior art patents is incorporated herein by reference. The operational history of hot-end inspection and ware reject devices such as those described above provides valuable production information, which has not been effectively utilized in the past.

U.S. Pat. No. 4,457,772 to Haynes et al. discloses a "Management Control System for Forming Glassware" including four microprocessor systems responsible respectively for overall factory control, overall shop control (wherein "shop" refers to a plurality of independent glassware forming machine sections), individual shop control, and individual section control. This patent does not, however, disclose specific apparatus for compiling hot end ware status information and reporting such information to the user.

Accordingly, it is a primary object of the invention to provide a system for monitoring the production characteristics of a glassware forming machine, and for providing operators and their supervisors with reports of the production history of these. As a related object, such a system should utilize information gained by monitoring the "hot end" of the forming machines.

A particular object of the invention is to provide accurate information concerning hot end production output and ware loss. Such information should be available by machine or shop, by section, and by individual mold cavity. Additionally, this system should provide information on other production parameters such as forming rejects and handling losses.

A further object is to provide versatile reporting capabilities, to enable plant personnel to specify report format and information content. Such reports should be available automatically, and on demand.

SUMMARY OF THE INVENTION

The above and additional objects are satisfied by the forming production monitor of the present invention, which automatically compiles and correlates production information. The production monitor consists of a system for reporting production data for glassware forming machines of the type which receive molten or viscous glass and process the glass to form rigid glassware articles. The monitoring system generates production reports tabulating various quantities relating to ware production and losses. In the preferred embodiment, the data acquisition and ware reject assemblies are hot end systems of the types described in commonly assigned U.S. Pat. Nos. 4,332,606 and 4,494,656. Alternatively or in addition to such hot end systems, the production monitor may receive ware inspection data from a cold end inspection system of a type which includes "mold identification" apparatus. In general terms, the production monitor of the invention receives production category data from a reject processor (i.e. at the hot or cold end), tabulates this data over a reporting period, and generates production data reports according to user-defined formats.

In the hot end production data system of the preferred embodiment, the forming production monitor receives operational data from "down and stuck" reject and swab ware reject assemblies for one or more forming shops. This information includes section down time; forming rejects tabulated by the swab ware reject system (e.g. cold molds or swab ware); handling losses such as down, stuck, or missing ware which are registered by the down and stuck assembly; and good ware into the lehr. Each container which passes by the light source-sensor pair is automatically classified in one of these "production categories", and is identified with a given cavity of a particular I.S. machine. The production monitor compiles this data over time, and issues reports automatically (e.g. at the end of each factory shift) or on demand. The production monitor memory retains relevant information about the shops it monitors, such as shift change times, to control automatic report generation.

The forming production monitor includes a plurality of counters or memory registers, each associated with a given production category. Advantageously, the counters are also identified with given time periods of data acquisition. Other elements of the production monitor include a report format memory for retaining user-defined report format data; an input device for determining the report parameters in response to user input; an output device for reporting the production category data according to the report formats, and a controller for selectively incrementing the counters and controlling the reporting of data.

The preferred hardware configuration of the production monitor incorporates an I/O terminal including a CRT display for operator interaction. This terminal includes a series of input keys or the like coded to a command menu, including a "format" key which allows the user to design report formats. Information may be tabulated by machine, by section, and by cavity, and may be broken down into given "forming categories", over given time intervals. This provides supervisory personnel with vital information for analyzing section forming and handling problems, job problems, and the like.

BRIEF DESCRIPTION OF THE DRAWINGS

The above and additional aspects of the invention are illustrated in the detailed description of the preferred embodiment which follows, which is to be taken in conjunction with the drawings in which:

FIG. 2 is an elevational view of a glassware optical sensor assembly in accordance with U.S. Pat. No. 4,494,656, part of the reject system of FIG. 1;

FIG. 3A is an elevational view of a bottle procession on the conveyor of FIG. 1, leading up to the optical sensor assembly;

FIG. 3B is a schematic view of the electronic output of the sensor output conditioning module of FIG. 1;

FIG. 6—Terminal Handler Program;
FIG. 7—Terminal Action Subroutine;
FIG. 8—State Act Subroutine;
FIG. 9—Data Breakdown by Section (Report Routine);
FIG. 10—Machine Category-Selected Category (Report Routine);
FIGS. 11, 12—Initialization Subroutine;
and
 FIG. 13—Interrupt Subroutine.

DETAILED DESCRIPTION

Figure 1:
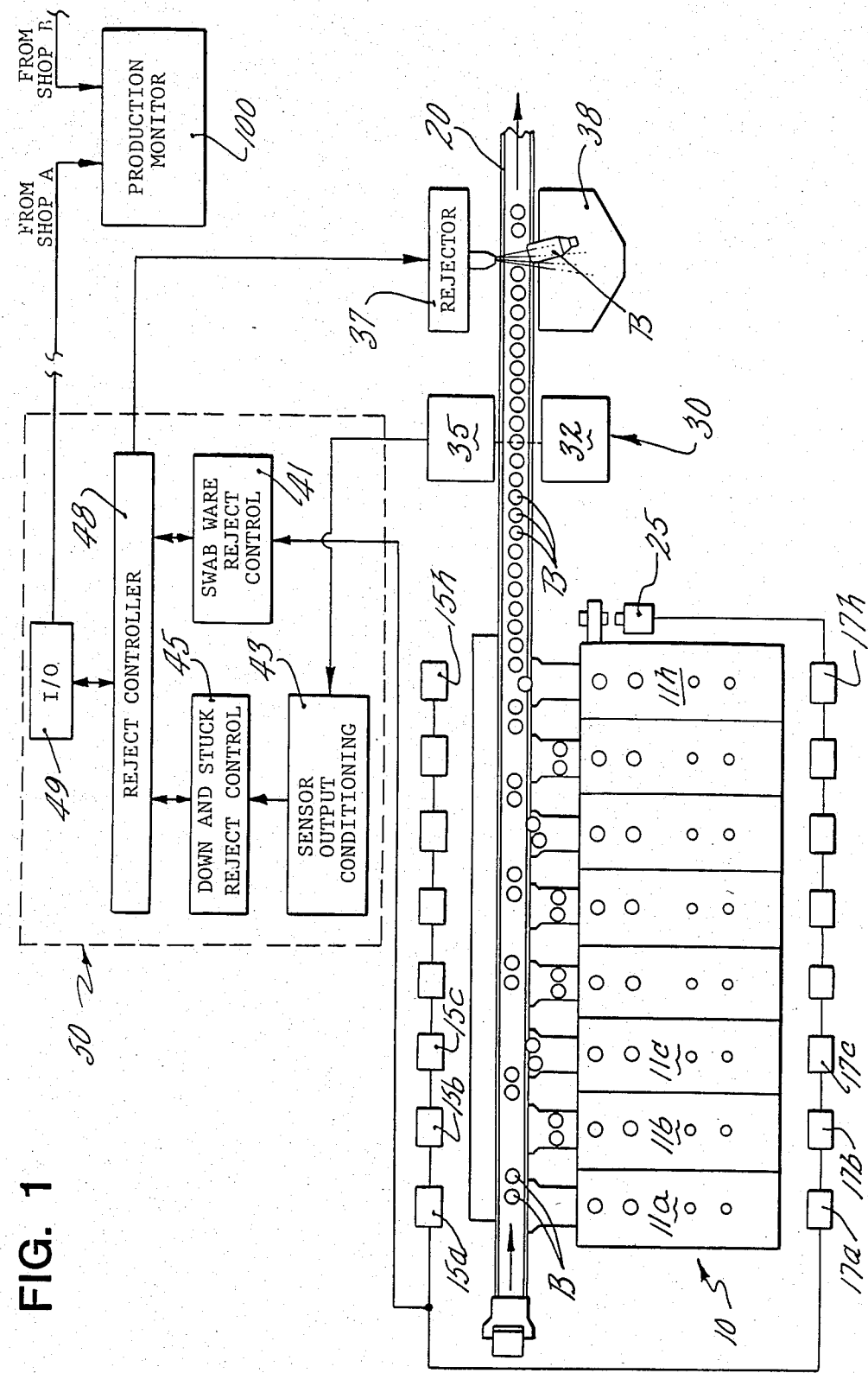
FIG. 1 is a schematic view of a hot end glassware forming and reject system, shown in cooperative relationship to the production monitor of the preferred embodiment.

Reference should now be had to FIGS. 1-13, which illustrate a preferred embodiment of the forming production monitor of the invention. FIG. 1 shows somewhat schematically the principal functional elements of the hot end ware reject system for a given forming shop A, shown in relationship to the forming production monitor 100. I.S. machine 10 is here shown as an eight section machine, comprising individual glassware forming sections 11a-11h. Each section has associated blank side and blow side reject switch banks 17 and 15, in accordance with commonly assigned U.S. Pat. No. 4,332,606. A given production cycle for each section will produce a plurality of glassware articles—here shown as three. These articles are transferred to a conveyor where they pass by a light source-sensor pair 30 as taught in commonly assigned U.S. Pat. No. 4,494,656.

Bottle registration signals from light source-sensor pair 30 are routed to reject console 50, which also receives an I.S. sync signal from sync switch 25 at a predetermined time in each I.S. machine cycle. Swab ware reject control 41 receives the operator-actuated swab reject signals from switch banks 15 and 17, as well as the I.S. sync signal via line 23. An output signal from light sensor 35 is conditioned and digitized by sensor output conditioning circuit 43, and the digitalized signal is processed by down and stuck reject control 45 (also responsive to the I.S. sync signal). The ware reject data from subassemblies 41 and 45 are processed by reject controller 48 to selectively actuate rejector 37, and this data is displayed to the operator via I/O interface 49, which also processes operator input information as explained below. The ware reject data and system status information stored in reject processor 48 is also sent to the forming production monitor of the invention 100, which is typically located in an office environment remote from the forming area. Production monitor 100 may receive data not only from the illustrated shop A, but also from other shops (here, one other shop B is indicated).

The preferred, illustrated embodiment of the present forming production monitor is advantageously employed in cooperation with various elements of the down and stuck ware inspection system of commonly assigned U.S. Pat. No. 4,494,656. This system incorporates a single light source—sensor pair 30 (FIG. 3A) to detect the procession of bottles B travelling on a conveyor 20 from the I.S. machine 10 to a stacker/lehr, glassware coating assembly, or other further processing station (not shown). A preferred arrangement of the light source-sensor pair 30 is illustrated in FIG. 2. The light source—sensor pair illustratively consists of a laser 32 and a solar cell 35, which face each other on opposite sides of the conveyor 20 and are adjustably positioned along vertical supports (not shown). The line of sight 33 of the laser beam extends across the bottle path at an elevation E proximate the top surface of the conveyor 20. Most advantageously, the elevation E is cooincident with the heel portion of a bottle, which as disclosed in U.S. Pat. No. 4,494,656 enables the detection of "stuck bottles" in an upright position. Higher placements of the light source-sensor pair 30 are nevertheless possible especially where it is only necessary to reject "down" bottles or bottles which are "stuck" and tilted.

As shown in the somewhat schematic diagram of FIG. 3A, a series of bottles B1, B2 etc. travel on conveyor 20 from the I.S. machine 10 in direction A. In the simplest case, the bottles are uniformally spaced by a nominal separation S in the direction of motion of conveyor 20. Several abnormal conditions are shown, however, in FIG. 3A. Bottles B3, B4 are spaced apart less than the distance S but are not "stuck". This condition is tolerable. Bottles B5 and B6 are "stuck" upright. Bottles B7 and B8 are "stuck", bottle B8 being "stuck" and tilted. Bottle B9 is "down". "Down" and "stuck" conditions are not considered tolerable. Light source sensor pair 30, in cooperation with associated signal processing electronics (FIG. 1) detects down and stuck conditions of glass bottles and in the case of an unacceptable bottle condition sends a reject signal to reject device 37, which removes the unacceptable bottle or bottles from the conveyor, to cullet chute 38.

In the preferred design of the down and stuck reject electronics the output of light sensor 35 is preconditioned by sensor output conditioning circuit 43, which generates analog signals (advantageously square waves) representative of the sensor output; digitalizing these signals; and feeds the digitalized signals to a programmed microcomputer within down and stuck reject control 45. The difference between the falling edge and rising edge of the corresponding square waves defines a container's width. As explained in detail in U.S. Pat. No. 4,494,656, this microcomputer is programmed to generate a reject signal if any one of three defects occurs:

1. the interval between successive falling transitions of sensor 35 exceeds an upper threshold;
2. such interval falls below a programmed lower threshold; or
3. the interval between successive rising and falling transitions of the output of sensor 35 falls below a third programmed threshold.

FIG. 3D illustrates a smoothed and amplified signal based upon the electrical output of sensor 35, for the sequence of bottles shown in FIG. 3A. Details of the down and stuck recognition circuitry, and of the programmed control thereof to implement the recognition process are not within the scope of the present invention. As discussed below, the operator may set up certain down and stuck reject parameters using control console 50 (FIG. 5) to meet the requirements of a given job.

With further reference to FIG. 1, swab ware rejection is initiated by the operator through two banks of switches 15 and 17, mounted on blank side and mold side on the I.S. machine 10. After swabbing a given cavity, the operator actuates the corresponding switch to signal rejection. These signals are recorded in memory within the Swab Ware Reject Control 41 during each I.S. machine cycle. At the beginning of the cycle, the signal enters a shift register and moves through the register as the ware progresses through blank, mold, dead-plate and conveyor stages. When the signal reaches the bottom of the shift register, the corresponding container will be at laser 32. This signal then causes a counter to be loaded with the desired number of rejects per swab, set by the operator using console 50 as explained below. Suitable logic circuitry 41 for implementing the above swab ware reject function is disclosed in commonly assigned U.S. Pat. No. 4,332,606, which is incorporated by reference herein. Blank and mold swab signals from each cavity are processed separately and can be set with different reject values. The counter generates a reject signal for each of the containers selected for rejection. These signals are relayed to a reject driver within the swab ware reject control circuitry to activate the reject device 37.

Figure 4:
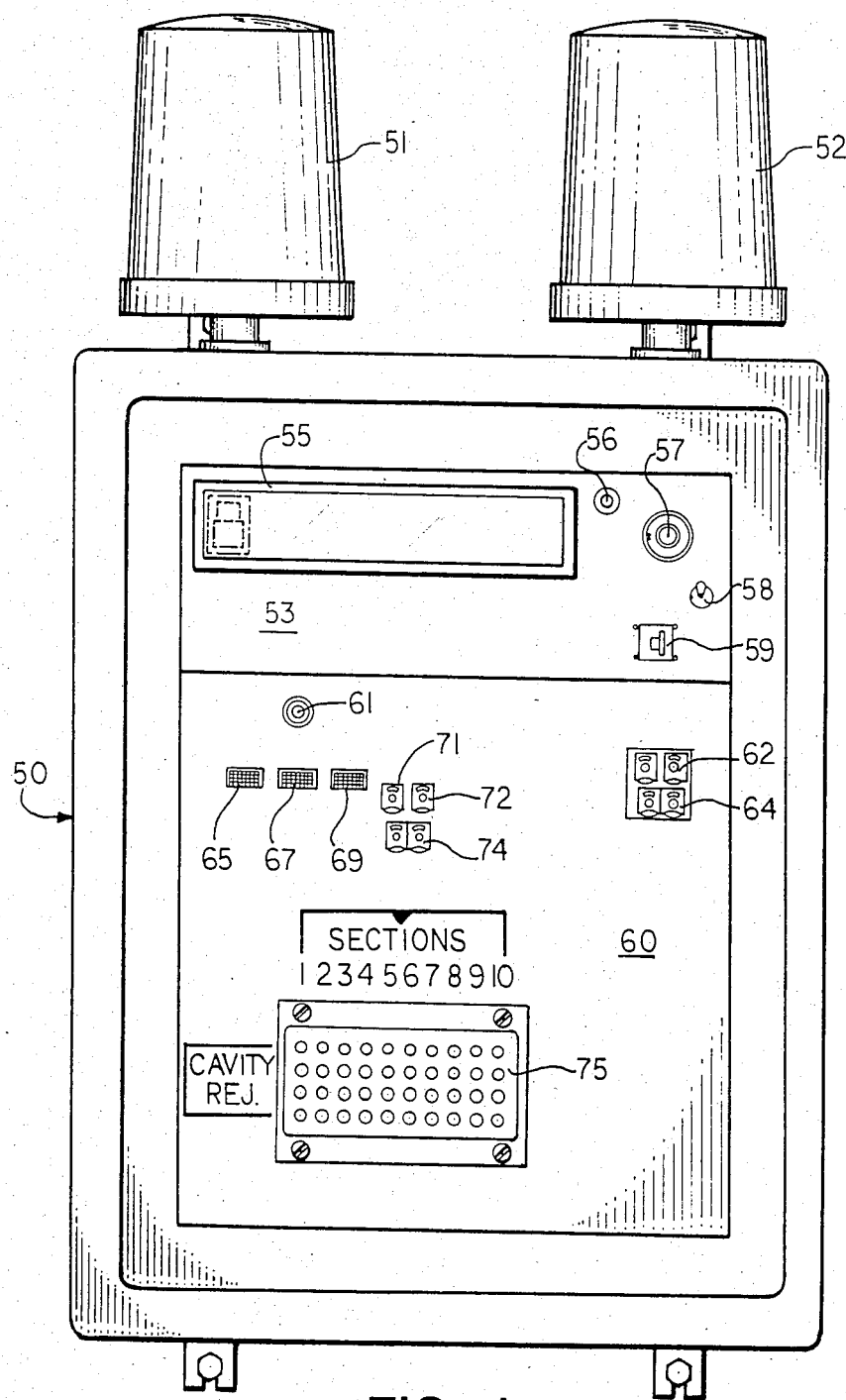
FIG. 4 is a side view of the operator's reject console from the apparatus of FIG. 1.

FIG. 4 illustrates an advantageous design of control console 50 of a type which enables the operator to set up and run swab ware reject and down and stuck ware reject functions for I.S. machine 10 (FIG. 1), and which displays certain important types of data during the testing and running of these functions. Console 50 includes display panel 53 and lower panel 60, as well as warning beacons 51 and 52. Beacon 51 signifies abnormal operating conditions, while beacon 52 alerts the operator to a preset mold swabbing schedule. Display 55 provides a digital numeric display of various categories of information, such as total bad ware and bottle throughput per minute past sensor 35; display categories are controlled by display selection switch 59. Spacing adjustment 57 enables the operator to establish a minimum spacing between two bottles before these are recognized as vertically stuck (a stuck condition is also recognized for tipped and stuck containers). Switch 58 controls the percentage tolerance of container width.

In lower panel 60, reset button 61 permits reject processors 41 and 45 (FIG. 1) to memorize container arrival information during set up. Rejects per swab switches 62 indicate the number of containers to be rejected after actuation of one of cavity reject switches 15, 17 (FIG. 1). Cavity Delay switches 64 are used in set-up, as explained below. Section firing order matrix switch 65 specifies the firing order of sections 11a, 11b, etc., while matrix switch 66 gives the section ware order on conveyor 20. Matrix switch 67 provides the amount of delay within the I.S. machine cycle for each section's ware to arrive at sensor station 30. Rotary switches 71 and 72 respectively set the delay for rejects from the blank side to the mold side, and the number of gobs formed per section. Switch 74 enables the operator to time swabbing cycles, i.e. beacon 52 will flash if this time interval has passed without a signal from a swab reject switch 15, 17. Light emitting diodes 75 indicate cavity rejects from each section 11; these light at the time of rejection of a bottle from a particular section and mold cavity.

In setting up the various reject functions, the operator calibrates the reject control timing and other parameters to the operational characteristics of I.S. machine 10 during the running of machine 10 in a set-up mode. Sync switch 25 is adjusted to be activated coincidentally with the passage of a bottle B past sensor station 30 in normal operation. Firing order switch 65 is set to list the order in which the various sections 11a, 11b, etc. are loaded, starting with the extreme upstream section 11a. Ware order switch 66 is then set to establish the actual order by section of bottles B on conveyor 20, beginning with that section with which the sync switch 25 is associated. Gobs per section switch 72 is set to the appropriate number.

Cavity delay switches 64 are initially set to the number of containers formed per I.S. machine cycle. The reset button 61 is pressed to input new container arrival timing data. During the set-up cycle the reject processors 41 and 45 assume that each bottle B is in its average position, and construct a timing "window" around these average arrival times. The operator latches all of reject switches "on" for a given section, and after approximately two IS cycles the reject device 37 should eject all ware associated with this section. The section delay switches are adjusted by an offset based upon whether the containers desired for rejection are behind or ahead of the containers actually rejected. After the cavity reject switches 64 are set, the operator sets reject cycles delay switches 67 to establish the number of IS cycles by which each of sections 11a, 11b, etc. is delayed before ware is rejected. After these operations are completed, the reject processors 41 and 45 will have completely memorized system timing—i.e. to identify given bottles arriving at sensor station 30 with particular section and section cavities of origin. The timing windows around the expected arrival times of the various bottle permit a limited variation of placement on conveyor 20.

Figure 5:
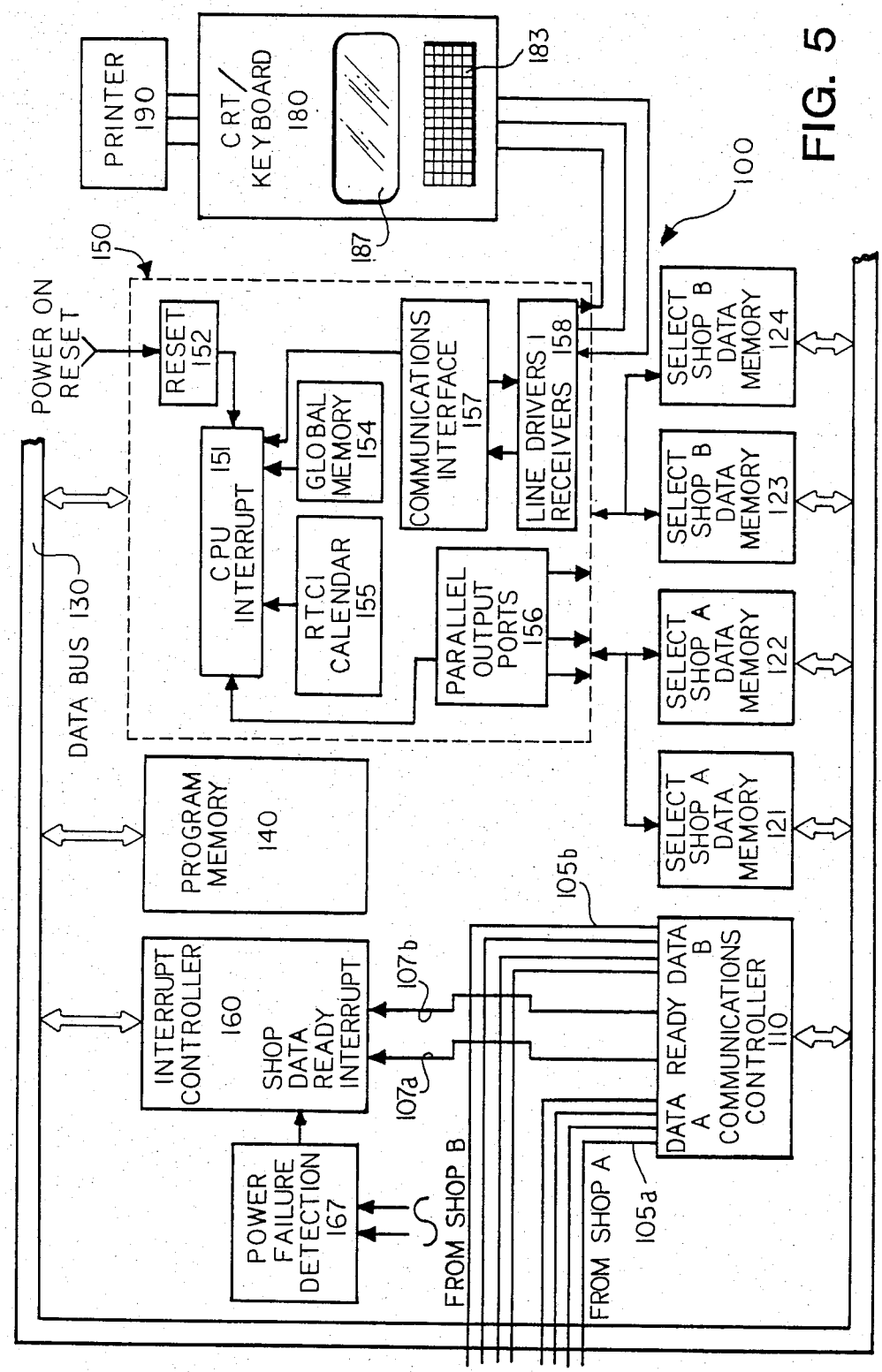
FIG. 5 is a circuit schematic diagram of the preferred embodiment of forming production monitor.

Reference should now be had to the block schematic diagram of FIG. 5, which illustrates the principal elements of the forming production monitor of the invention. Monitor 100 includes various electronic logic assemblies linked to a bidirectional data bus interface 130, illustratively an STD bus. Production monitor 100 receives information from the reject console 50 of one or more shops over data lines 105. In FIG. 5, data is received from two shops A and B via data lines 105a, 105b. This incoming data is collected by communications controller 110, which illustratively comprises a Dual Channel Multi-Protocol Communications Controller of Micro/Sys, La Canada, Calif. Communications Controller 110 operates asynchronously using RS422 serial ports to collect data on a bit-by-bit basis until one byte of data is received corresponding to production datum for a given bottle. When data collection is complete, communications controller 110 transmits over one of lines 107a, 107b a "Data Ready" flag to Interrupt Controller 160, which provides a programmable interrupt structure for Controller 150 and identifies the source of the interrupt request. Controller 150 acts as the central processor for production monitor 100, controlling the logging of production category data as well as the reporting of this data.

In an operative embodiment of the invention, Interrupt Controller 160 is an SB8301 Priority Interrupt Controller of Micro/Sys. Corp. and Controller 150 comprises a ML 145 single board microprocessor of Micro Link Corp, including a central processing unit (CPU) 151 (illustratively an 8085 AH 8-bit microprocessor of Intel Corp.), with various related on-board hardware elements. Other hardware elements within Controller 150 include Global Memory 154, which stores temporary variables, time/date data, and other non-shop-related data; real time clock/calendar 156, illustratively programmed to provide a sixty second interrupt signal to CPU 151; parallel output ports 156; serial I/O ports comprising communications interface 157 and line drivers/receivers 158; and reset module 152, which supports a pushbutton reset of CPU 151. In a specific operative embodiment of the invention, communications interface 157 comprises a 2661A Universal Asynchronous Receiver/Transmitter (UART); the Parallel Output Port 156 comprises an 8255A Programmable Peripheral Interface of Intel Corporation; and RTC/Calendar 155 comprises a MM58174 Microprocessor—Compatible Real-Time Clock of National Semiconductor Corp.

Program memory 140, illustratively EPROM memory elements, contains the operating programs to control data compilation and the definition and generation of reports. Principal subroutines of the operating program are explained below with reference to flow chart schematic diagrams (FIGS. 6-13). Power failure detection circuit 167 detects the loss of line power and in this situation acts via Interrupt Controller 160 to interrupt the normal operation of CPU 151 and prevent the writing of incorrect data. Back up battery power (not shown) protects against the loss of volatile memory 121-124 and 154.

Data memories 121-124 maintain a running count of ware by production or ware category, classified by console 50 according to the scheme showed in Table 1, with one byte of data assigned to each bottle B. Advantageously memories 121-124 comprise nonvolatile RAMs which are mapped to given real time intervals and ware categories, and are thereby addressed under the control of Controller 150. Illustratively memories 121-124 tabulate ware category counts over fifteen minute intervals. Separate counters are provided for each cavity of I.S. machine 10. This data collection will continue over a given duration of production counts, advantageously twenty four hours, as long as the monitor logic receives power from power supply 165, and data is delivered by reject console 50. Therefore even when the user is producing a printed report through display terminal 180, as discussed below, the monitor logic will continue to log data. At the end of this period, new incoming data will supercede the previous day's data for the same time interval.

TABLE 1

| WARE CATEGORIES | |
|---|---|
| 1. Good (upright) bottle | GOOD WARE |
| 2. No bottle - section is down, ware not formed | SECTION DOWN TIME |
| 3. No bottle - removed from conveyor | MISSING FROM CONVEYOR |
| 4. Console reject - latched reject switch | DUMPED FROM CONVEYOR |
| 5. Console reject - momentary reject switch | SWAB REJECT |
| 6. Console reject - down or stuck bottle | DOWN/STUCK REJECT |

Terminal 180 enables the user to input information such as shift change times and production report formats, and includes keyboard 183 and CRT display 185. Commands and other information keyed in by the operator, and data to be displayed on the terminal screen, are routed through Communications Interface 157, which buffers data interchange with CPU 151.

Table 2 illustrates an advantageous command menu for production monitor terminal 180. The most commonly employed command is F—"Set format for shop report", which instructs Controller 150 to carry out a setup procedure for custom report definition. In this mode, terminal 180 displays the current setting of each report item, and enables the user to change the item by following displayed instructions.

Tables 3A and 3, which are intended to be read in sequence, set forth a typical production report—an automatic shift-end report for a six-section machine. The user initializes appropriate report formats for each shop and each shift, which reports are automatically printed when interval timer 136 reaches a preprogrammed shift-end value (programmed via command 'T', Table 2). Various other commands listed in Table 2 are used to input the header information for the report of Table 3A.

TABLE 2

| PRODUCTION MONITOR TERMINAL COMMAND MENU | |
|---|---|
| F - | set Format for shop report |
| P - | Print shop resort |
| M - | enter Message for shift-end shop report |
| N - | set shop Number and job Number |
| D - | set FPM clock/calendar Date and time |
| T - | set shift-end Times for auto reports |
| S - | select Shop for use of shop commands |

TABLE NO. 3

SAMPLE FORMING PRODUCTION REPORT
SHOP 31 JOB NUMBER 449 6 SECTION 2 GOB
February 16, 1985 3:45 PM
AUTOMATIC SHIFT-END REPORT,
TIME PERIOD BEGINNING 7:45 AM, ENDING 3:45 PM EXCESSIVE SECTION DOWN LOSS - SEC 6 -
REPLACEMENT OF MOLDS AT 11:15 AM
MACHINE SUMMARY:

| | | |
|---|---|---|
| SECTION DOWN TIME | 660 | 0.9% |
| MISSING FROM CONVEYOR | 614 | 0.8% |
| DUMPED FROM CONVEYOR | 154 | 0.2% |
| SWAB REJECT | 1024 | 1.3% |
| DOWN/STUCK REJECT | 922 | 1.2% |
| WARE TRANSFER LOSS | 307 | 0.4% |

TABLE NO. 3-continued
SAMPLE FORMING PRODUCTION REPORT
SHOP 31 JOB NUMBER 449 6 SECTION 2 GOB
February 16, 1985 3:45 PM
AUTOMATIC SHIFT-END REPORT,
TIME PERIOD BEGINNING 7:45 AM, ENDING 3:45 PM

| TOTAL LOSSES | 3681 | 4.8% | |
|---|---|---|---|
| GOOD WARE | 73119 | 95.2% | |
| TOTAL GOBS CUT | 76800 | 100.0% | 160 BPM |
| | | at average | |

DATA BY INDIVIDUAL SECTION:

| 1 | 2 | 3 | 4 | 5 | 6 |
|---|---|---|---|---|---|
| GOOD WARE percentages - whole section ||||||
| 95.5% | 96.3% | 94.8% | 96.4% | 96.6% | 92.1% |
| SECTION DOWN TIME percentages - whole section ||||||
| 1.0% | 0.0% | 1.3% | 0.0% | 0.0% | 3.8% |
| MISSING FROM CONVEYOR pieces - each cavity ||||||
| front cavity ||||||
| 50 | 43 | 54 | 48 | 37 | 76 |
| 58 | 49 | 47 | 40 | 44 | 56 |
| back cavity ||||||
| DUMPED FROM CONVEYOR pieces - each cavity ||||||
| front cavity ||||||
| 12 | 5 | 10 | 7 | 5 | 21 |
| 7 | 13 | 8 | 10 | 20 | 6 |
| back cavity ||||||
| SWAB REJECT percentages - whole section ||||||
| 1.2% | 1.4% | 1.2% | 1.4% | 1.3% | 1.2% |
| DOWN/STUCK REJECT pieces - each cavity ||||||
| front cavity ||||||
| 32 | 40 | 78 | 56 | 54 | 72 |
| 54 | 68 | 64 | 50 | 38 | 52 |
| back cavity ||||||

DATA BREAKDOWN OVER TIME:

| 1 | 2 | 3 | 4 | 5 | 6 |
|---|---|---|---|---|---|
| SECTION DOWN TIME ||||||
| minutes-whole section-each line = 1 hour ||||||
| 7:45 AM ||||||
| 0 | 0 | 0 | 0 | 0 | 0 |
| 0 | 0 | 0 | 0 | 0 | 0 |
| 5 | 0 | 0 | 0 | 0 | 0 |
| 0 | 0 | 0 | 0 | 0 | 14 |
| 11:45 AM ||||||
| 0 | 0 | 6 | 0 | 0 | 0 |
| 0 | 0 | 0 | 0 | 0 | 0 |
| 0 | 0 | 0 | 0 | 0 | 4 |
| 0 | 0 | 0 | 0 | 0 | 0 |
| 3:45 PM ||||||

The principal sections of the illustrated report are the "Machine Summary", "Data by Individual Section", and "Data Breakdown Over Time". The Machine Summary summarizes the data logged for the various ware categories of Table 1, and overall production and loss statistics, for the monitored machine as a whole. These summaries are given in both absolute (numbers of bottles) and percentage (of total gobs cut) terms. The Data by Individual Section portion of the report breaks down the ware category data of Table 1 by section and cavity. The Data Breakdown Over Time summarizes the ware category data by section over predefined time intervals. The breakdown of ware category data by section, cavity, and time interval corresponds to the subdivisions of data memories 121-124 (FIG. 6), discussed above. When the user uses the 'F' command (Table 2) to define a particular report format, particular items in the "Machine Summary" section may be suppressed, as well as particular time indexes in the reporting period.

Table 4 lists the various categories of information which can be reported by production monitor 100, tabulated against the formatting choices which are available for each type of information. Good Ware provides a count of good ware passing optical sensor 30. Total Gobs Cut is derived from the sync signals source 25, and represents the number of sync signals multiplied by the total number cavities in I.S. machine 10. Average Machine Speed signifies the time rate of Total Gobs Cut. Missing from Conveyor gives a count of the number of times in which sensor 30 fails to detect the presence of a bottle within a predefined window, as discussed above. After failing to detect any bottles for a given section for three consecutive cycles, Reject Processor 48 initiates a "section down" status, which continue until a bottle is detected. Section Down Time represents a count of the number of forming cycles in which such status exists.

Figure 11:
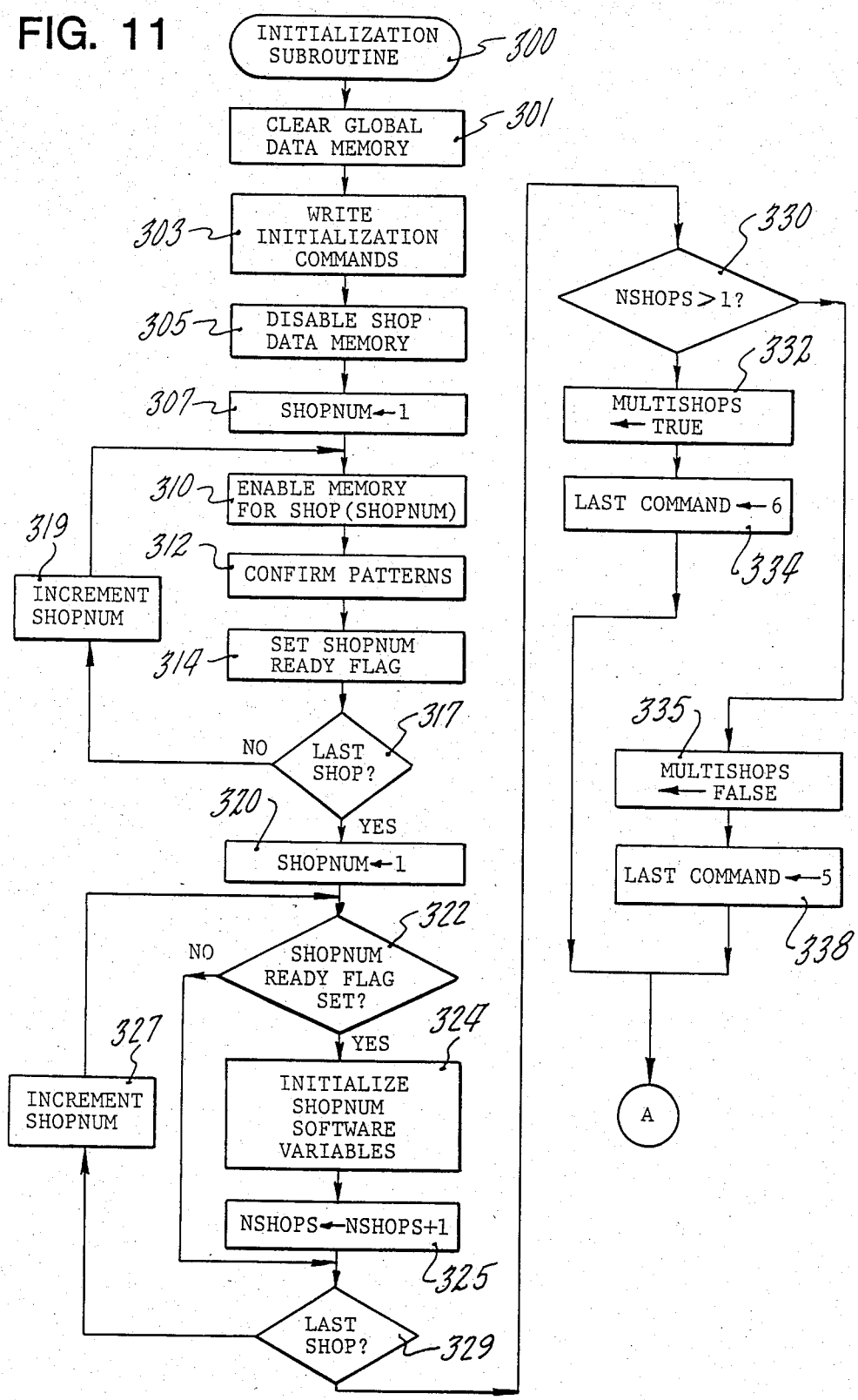
Figure 12:
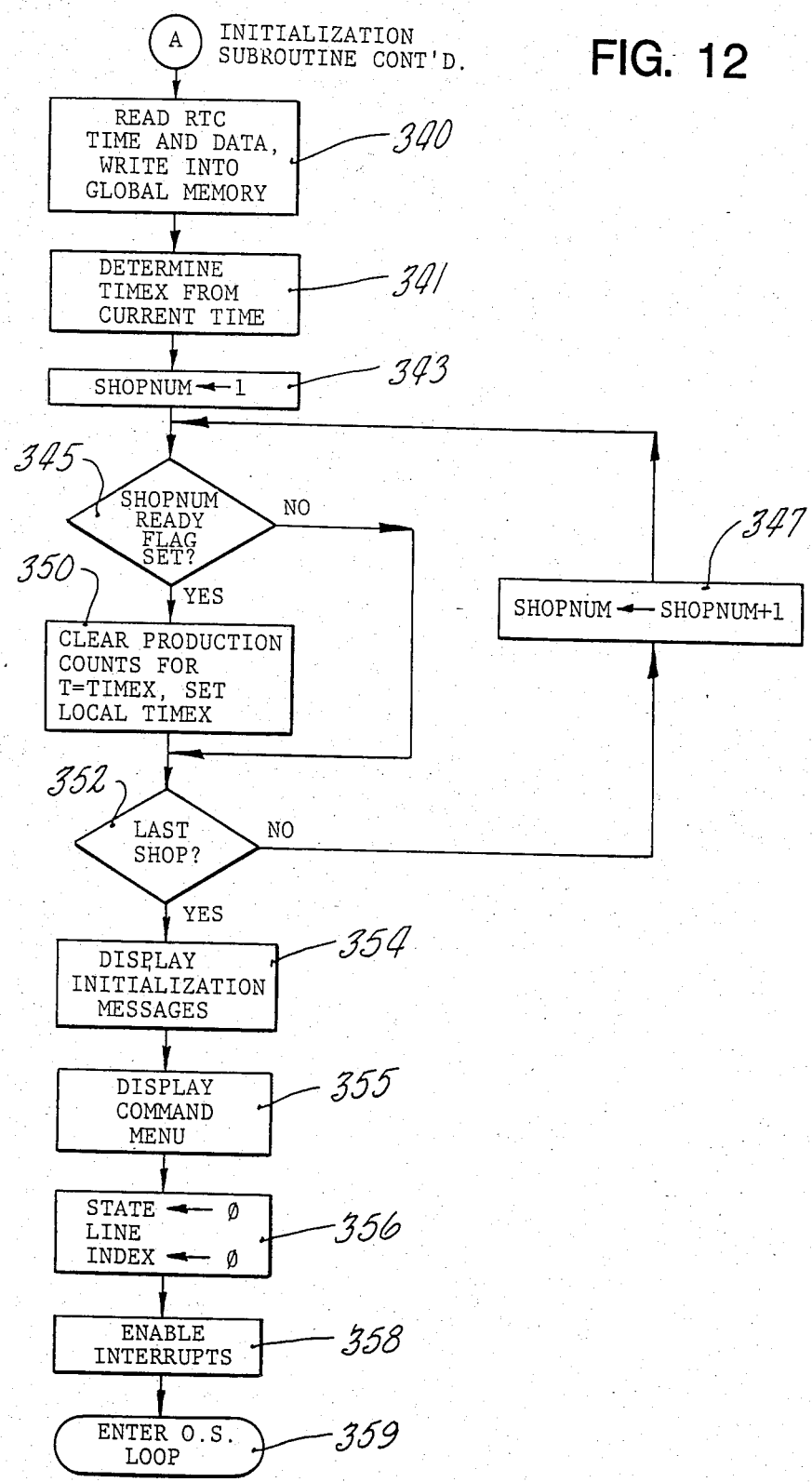
Figure 13:
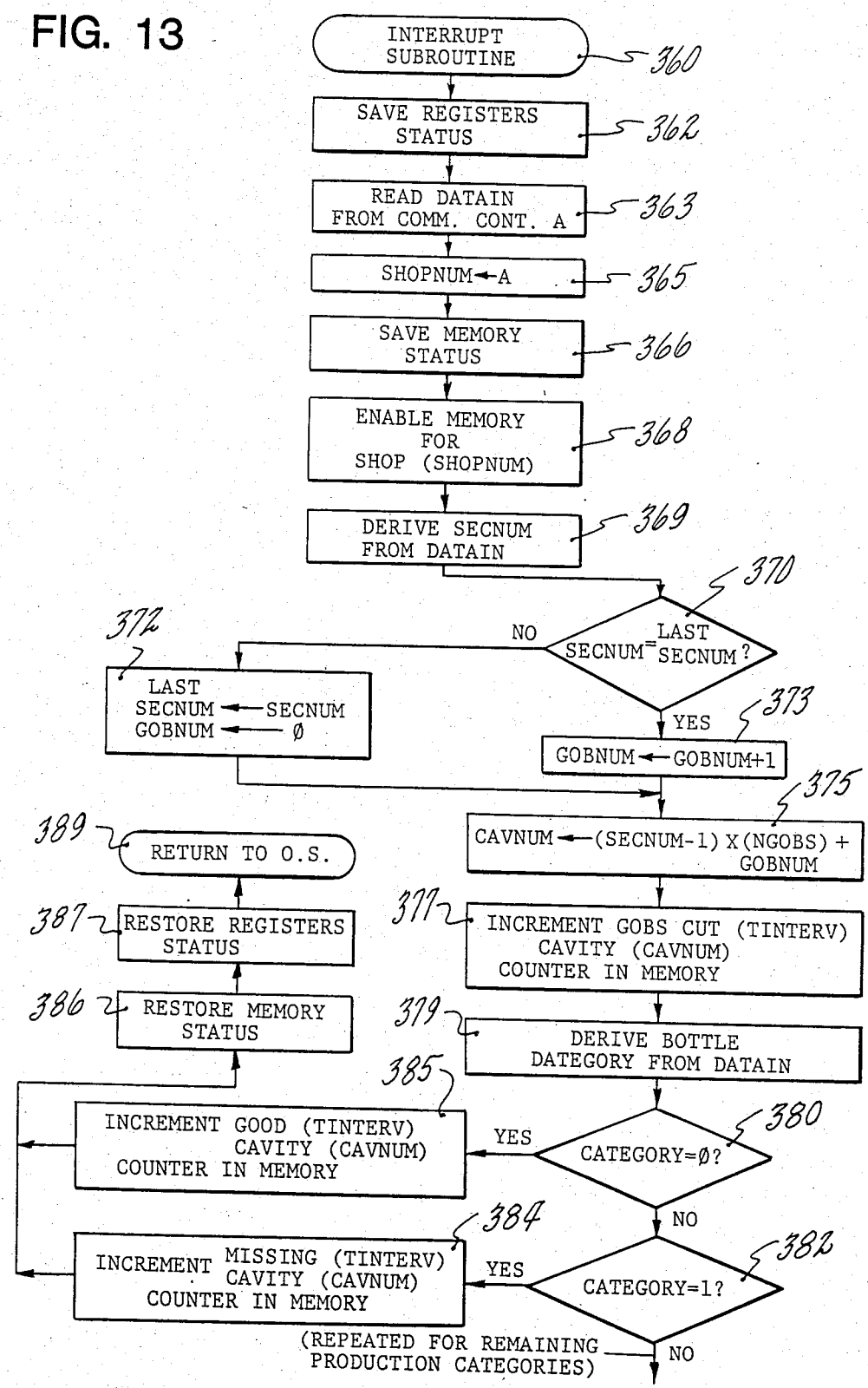

FIGS. 11 and 12 illustrate the sequence of steps involved in initializing the hardware and software elements of production monitor 100 upon powering up the system, or after resetting the controller 150 via pushbutton reset 152. These functions are implemented under the control of nonvolatile program memory. At 301 the system clears the global data memory 301 to ∅ values. At 303 (which actually comprises a series of steps) the controller writes initialization commands to parallel output ports 156, RTC/calendar 155, interrupt controller 160, and UART 157. At 305 controller 150 disables the shop data memories 121-124. The shop number index SHOPNUM is set at the first shop value at 307, and the program then enters a shop memory enabling loop comprising steps 310, 312, 314, 317, and 319.

TABLE 4
REPORT FORMAT CHOICES

| INFORMATION | By Shop | By Shift | On Demand | By Section | By Cavity | Breakdown Over time | By Pieces | By Percentage |
|---|---|---|---|---|---|---|---|---|
| Good Ware | X | X | X | X | X | X | X | X |
| Section Down Time | X | X | X | X | X | X | X | X |
| Missing From Conveyor | X | X | X | X | X | X | X | X |
| Dumped From Conveyor | X | X | X | X | X | X | X | X |
| Swab Reject | X | X | X | X | X | X | X | X |
| Down/Stuck Ware | X | X | X | X | X | X | X | X |
| Ware Into Lehr | X | X | X | | | | X | X |
| Total Gobs Cuts | X | X | X | | | | X | X |
| Average Machine Speed | X | X | X | | | | | |

This loop enables the shop memories for each of the shops communicating with the production monitor 100, and sets a flag to indicate that the memory is installed and that the system properly communicates data patterns from the respective shops.

The loop consisting of steps 322, 324, 325, 329 and 327 initialized the shop software variables for each shop for which a "hardware installed" flag had been set at 314. The branch block including steps 330, 332, 334, 335, and 338 eliminates the 'S' commands from the command menu (Table 2) if only one shop is installed.

Referring to FIG. 12, the initialization subroutine at 340 then reads the time and data from RTC/Calendar 155 (FIG. 5), which information is retained during power-off using battery backup power; this information is written into global memory 154. At 341 the controller determines the interrupt time interval TIMEX from the current time day read at 340. In the loop of steps 345, 350, 352, and 357 the program loops throught the installed shops to clear the production coutns for the time interval TIMEX and set the local value for TIMEX. The program now displays appropriate initialization messages for the particular job set-up data, followed by the command menu Table 2). Finally, after terminal handler STATE and LINE indices (discussed below with reference to FIGS. 6–8) are zeroed, the interrupt subprogram (discussed below) is enabled at 358. This initiates the main operating system (OS) loop for production monitor 100.

The OS loop is the principal operating program for production monitor 100 (FIG. 5), wherein interrupt controller 160 periodically diverts operation of controller 150 to enable the logging of production data from a given shop via communication controller 110. Upon assembly of a complete data word by communications controller 110; the controller's output line for the appropriate shop is activated, thereby triggering interrupt controller 160 to divert program execution by Controller 150. The diverted program execution is controlled by interrupt subroutine 360 (FIG. 13) which for illustrative purposes assumes receipt of data from Shop A. At 352, this routine saves the current status of the global memory registers 154. At 363, controller 150 reads the newly-received byte from communications controller 100, which has an actuated (READY) output line for Shop A. At 366 the current memory status is saved, and the shop memory for shop A is then enabled to log the newly received data.

In the preferred embodiment, each production data byte comprises an eight-bit and including bits representing section number (4 bits) ware category (3 bits) and a check bit. At 369 the program derives the section number SECNUM from this data byte, and in the branch block comprising steps 370, 372, and 373 compares this value with the previous one (LAST SECNUM). If these values match, the program increments GOBNUM to reflect the receipt of the succeeding GOB data from the same section; otherwise LAST SECNUM is updated and GOBNUM reset to $\emptyset$.

At 375 the program derives CAVNUM according to the formula shown. Controller 150 then increments the appropriate counter in Shop A Data Memory 121, 122 at 377—i.e. the counter for GOBSCUT (TINTERV) CAVITY (CAVNUM), where TINTERV is the current time interval. The program that extracts the ware category information (Table 1) from the newly received byte and increments the appropriate ware category counter in memory. This counter is determined using the case block comprising steps 380, 385; 382, 384; etc. (only the cases for categories $\emptyset$, "GOOD", and 1, "MISSING", are shown). Finally, the memory and registers status are restored at 386, 387, and the program reverts to the main 0.S. loop.

Figure 6:
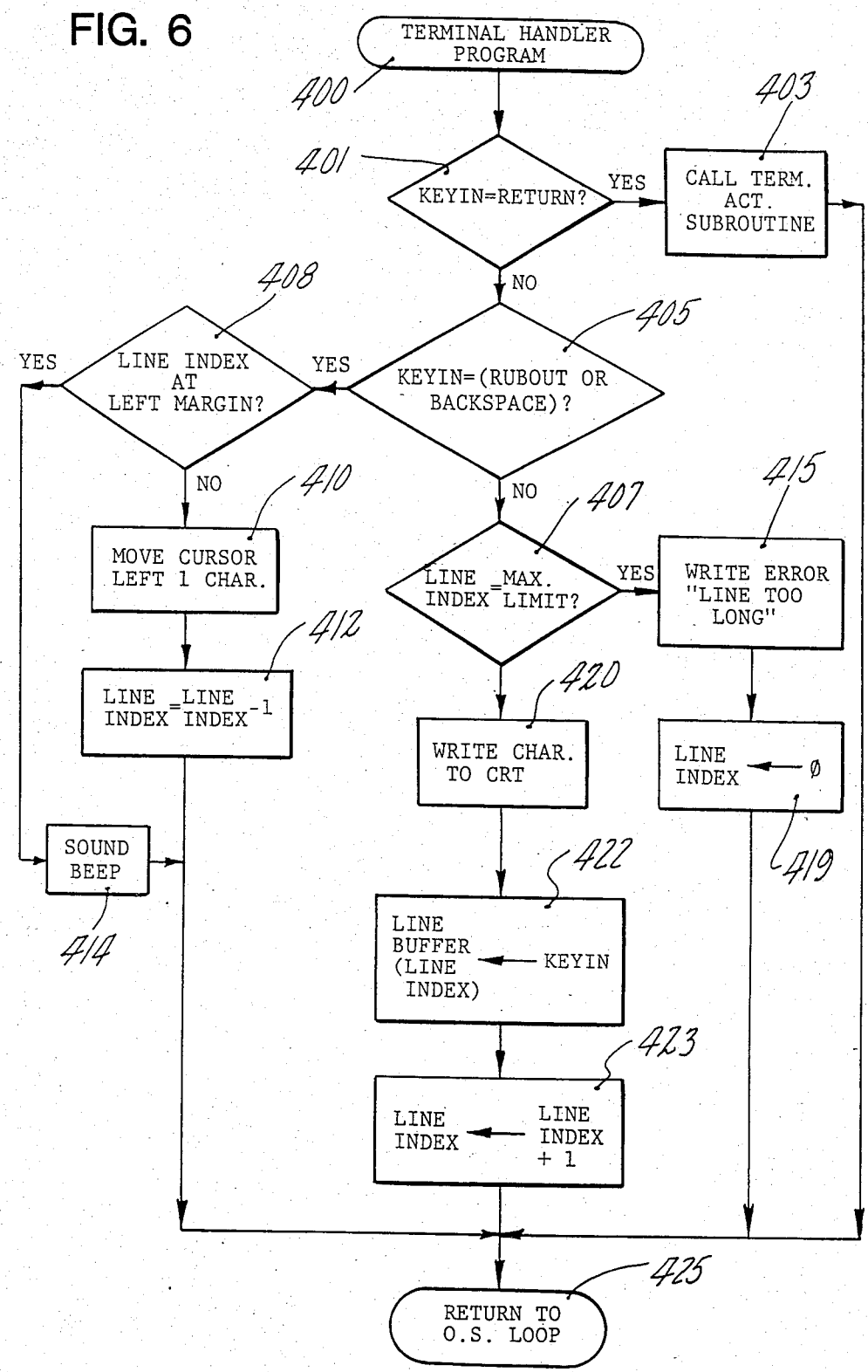
FIGS. 6-13 are flow chart schematic diagrams of various software routines of the production monitor control program, including.
Figure 7:
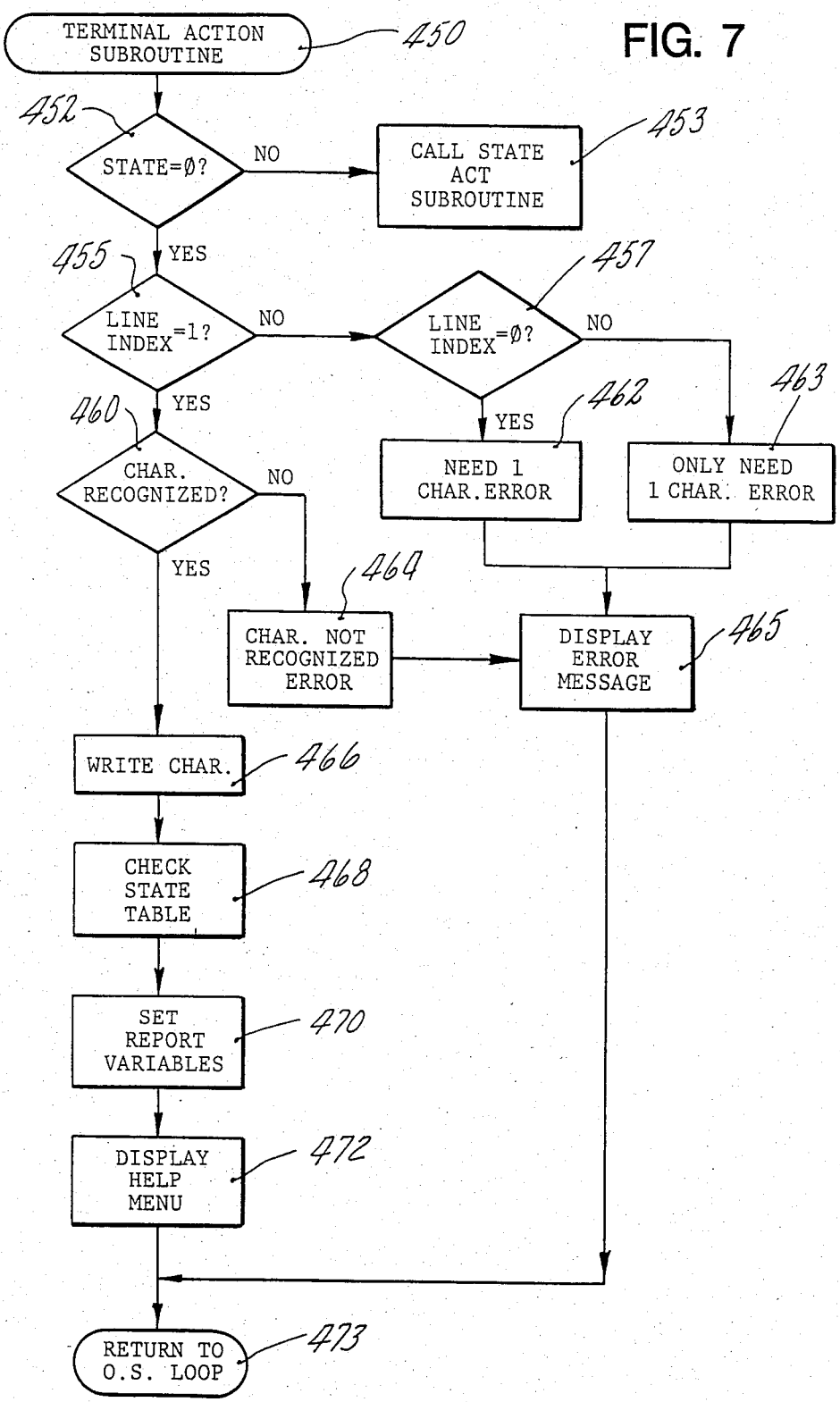
Figure 8:
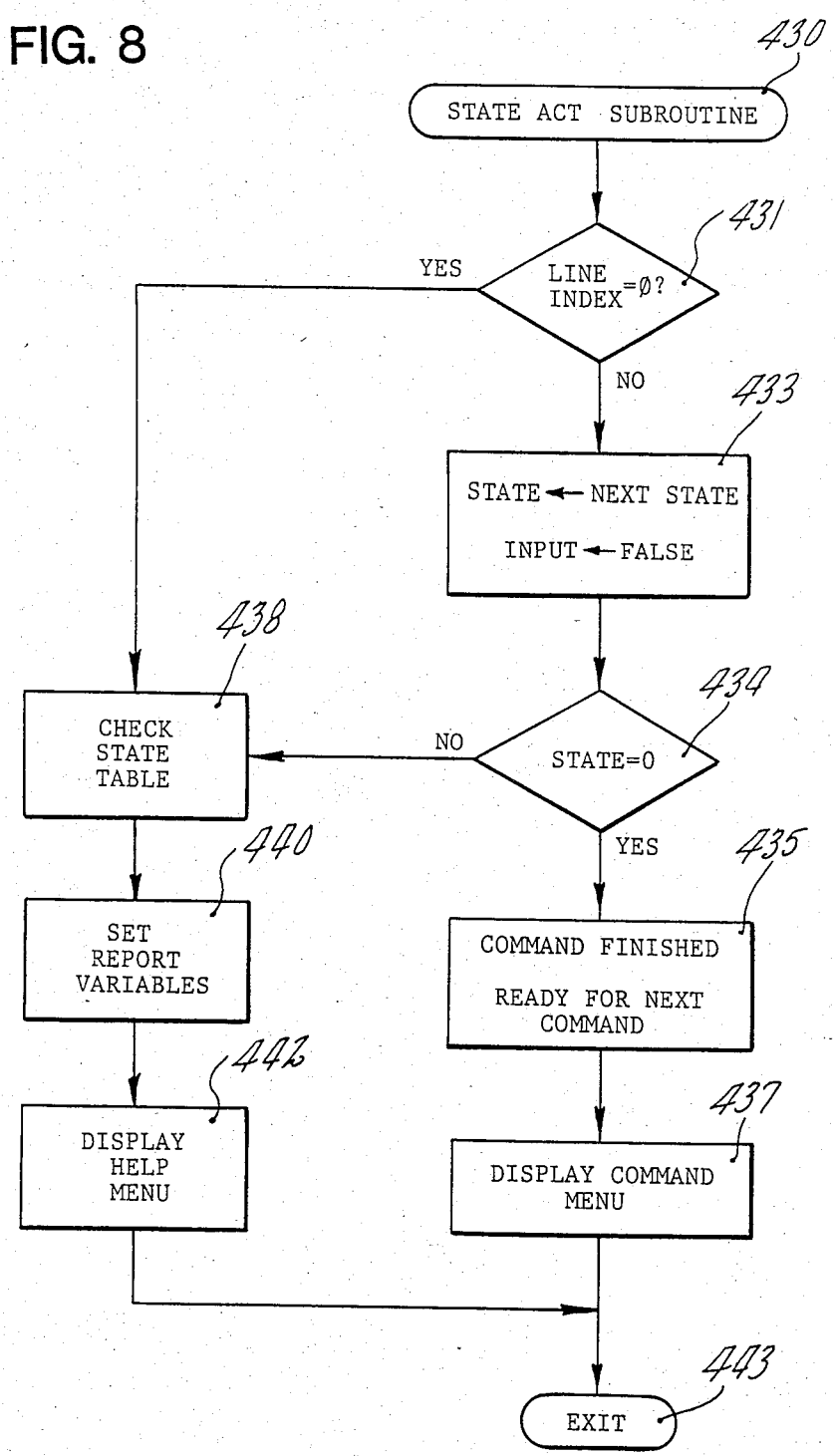

FIGS. 6–8 illustrate various related subroutines which together control the handling of information keyed into the CRT terminal 180. The Terminal Handler subprogram (FIG. 6) is initiated by the setting of a "character ready" flag in communications interface (UART) 157. This signifies the receipt from terminal 180 of ASC11-coded data KEYIN at UART 157. If KEYIN corresponds to a carriage-return, the program branches at 401 to 403 and calls the TERM ACT subroutine, discussed below. Otherwise, KEYIN is tested at 405 for the values RUBOUT and BACK SPACE; in either case the program branches to 408. The branch block 408, 410, 412, 414 checks whether the LINE INDEX is at the left margin. If so, the program sounds a BEEP indicating RUBOUT and LINE SPACE are unacceptable; if not, the cursor is moved one space to the left and LINE INDEX is decremented. In either case, the program then reverts to the OS loop.

If KEYIN was found not to equal RUBOUT or backspace at 405, the line index is compared at 407 with its maximum permissible value. The effect of reaching this limit is to write a "LINE TOO LONG" error at 415, reset LINE INDEX to $\emptyset$, and return to the 0.S. loop. Otherwise, in steps 420, 422, and 423 the entered character is written to the CRT, KEYIN is written into the line buffer at the location for LINE INDEX, and LINE INDEX is incremented. Having written the entered character, the program returns to the 0.S. loop.

The Terminal Action subroutine, which is called at step 403 of the TERMINAL HANDLER program, is plotted in FIG. 7. This subroutine controls the system response to input keys, which is triggered by the entry of a carriage return terminating a string of characters entered into the line buffer. The response to such entry depends on the value of STATE (i.e. current terminal state). If STATE $\neq \emptyset$, indicating the system is not ready for a main-level command, the program branches to 452 to call the STATE ACT routine (discussed below). This indicates that the system has already begun to respond to a command, setting STATE to a nonzero value. If STATE $= \emptyset$ indicating readiness for a command, the program tests LINE INDEX at 455. As main-level commands (Table 2) are single charcters, non-equality of LINE INDEX to 1 routes the program to an error-testing branch block 457, 462, 463, 465. This block causes the appropriate error message (steps 462, 463) to be displayed at 465, followed by return to the main OS loop (still ready for a command). In the case of a single entered character, the program at 460 compares this character with the authorized command set (Table 2, possibly omitting command S) and writes a "CHARACTER NOT RECOGNIZED" error at 464, 465 if this comparison fails. Otherwise, the program writes the character and its corresponding command, assigns an appropriate value to STATE, and sets one or more report variables at 470 (preferably, by assigning default values). The system then displays the principal Help screen, and returns to the OS loop.

The STATE ACT subroutine shown in FIG. 8 is called within the Terminal Action routine if a nonzero state is detected at 452. This subroutine enables the operator to confirm a previous entry (command followed by carriage return) by repeating the carriage return—a confirmatory action for safety. If the LINE INDEX is found to equal $\emptyset$ at 431, (i.e. only carriage return entered) the program branches to steps 438, 440 and 442, which are identical to steps 468, 470, and 472 of the Terminal Action program, discussed above. Otherwise, the operator has contradicted his earlier instruction with a new one, and at 433 the program updates STATE and flags the prior input as false. If the update value of state is found to have a nonzero value at 434, the program branches to steps 438, 440 and 442, explained above. A STATE =∅ condition signifies that the command has been finished, and an appropriate message is written and displayed at 435, followed by display of the command menu (at 437) and return to the OS loop.

Figure 9:
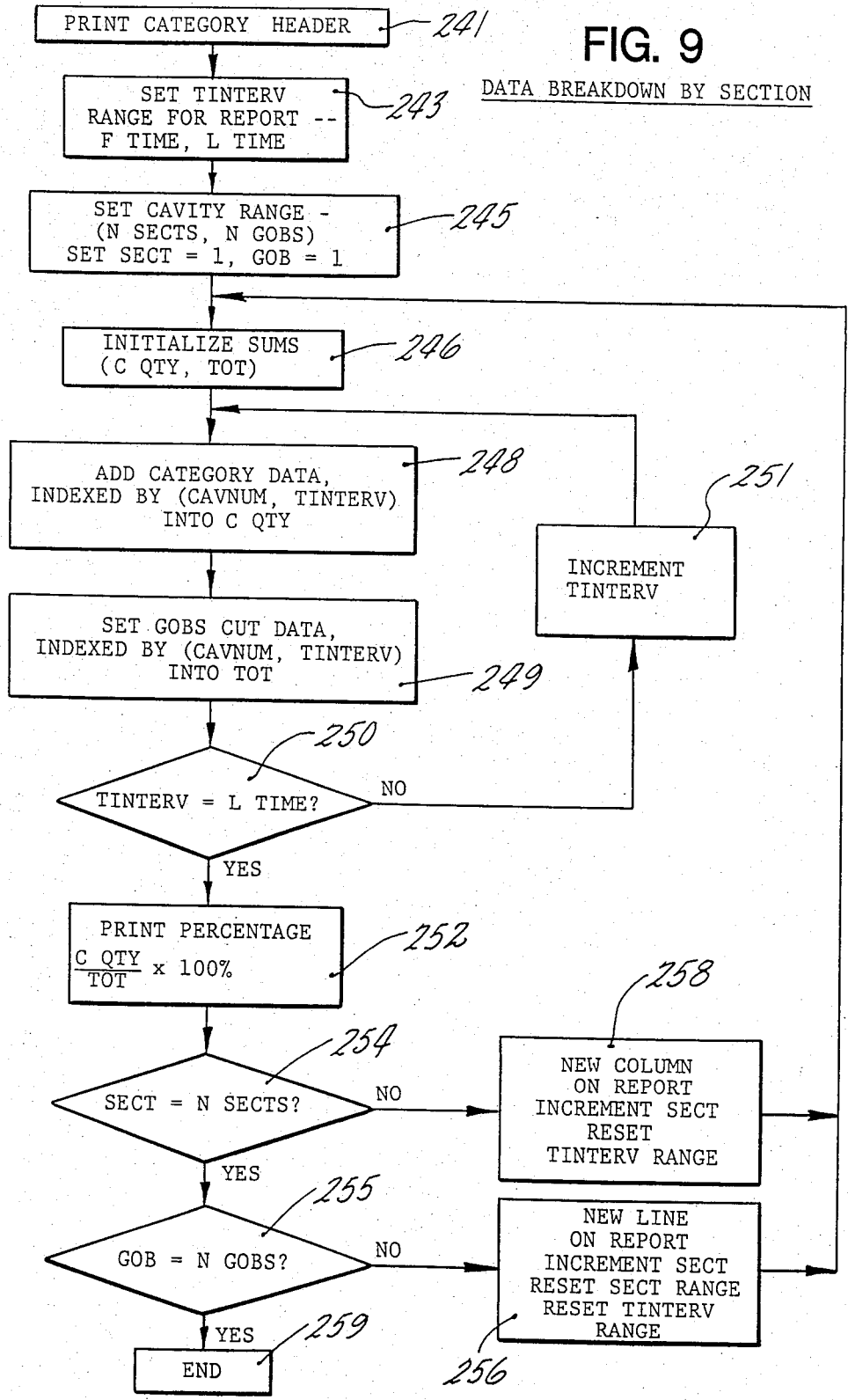

FIG. 9 illustrates the principal steps of a subprogram for generating the "Data Breakdown by Section" portion of a report for a selected information category. After printing the category header (of Tables 3A, 3B) at 241, the user is asked to key in the time interval and cavity ranges for the report at 243, 245. The cavity values SECT, GOB are initialized at 245, and the cavity and gobs cut counts QTY, TOT are intialized at 246. The loop comprised of steps 248, 249, 250 and 251 provide running totals of category data and gobs cut data, indexed by the cavity ID and TINTERV value (current time interval). This loop is repeated over the preset time interval range; when TINTERV=LTIME, the program exits from the loop to print the category percentage $$\left( \frac{CQTY}{TOT} \times 100\% \right)$$

for the applicable values of SECT and GOB.

The loop of steps 254, 258, and 246 causes the inner data compilation loop 248-252 to be repeated for successive values of SECT until SECT=NSECTS. Similarly, the outer loop comprising steps 255, 256, and 246 causes reiteration of the two inner loops until GOB=-NGOBS—i.e. the number of cavities per section. With reference to the illustrative (two gob) report shown in Table 3B, this results in two rows of percentage figures for Down/Stuck Reject—one row for the front cavity and one for the back cavity.

Figure 10:
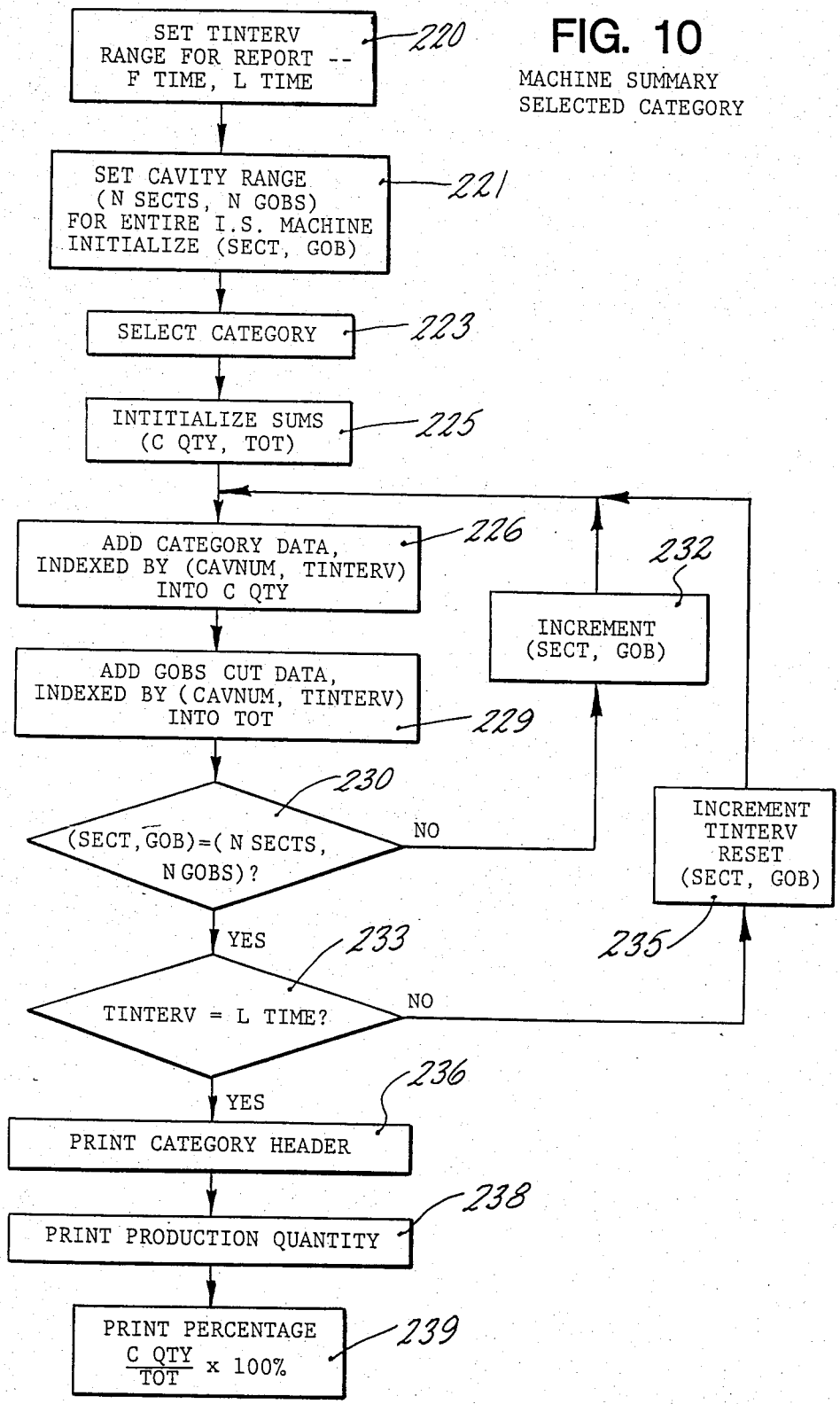

FIG. 10 is a flow chart schematic diagrm of a suitable control program for generating a machine summary for one of the selected information categories listed in Table 4. At 220 the user sets the report's range for the time interval index TINTERV by specifying FTIME and LTIME. At 221 the user keys in the cavity range (TSECT, TGOBS) for the entire I.S. machine. The section and gob values (SECT, GOB) are then initialized. At 223 the operator designates the ware category. CPU 130 then intializes the running sums (CQTY, TOT) of category and gobs cut data. In the loop consisting of steps 226, 229, 230, and 232, the production monitor adds the category and gobs cut data (both indexed by cavity, TINTERV) into the running sums (CQTY and TOT) from the appropriate counters of memories 221-224 (FIG. 6). This process will continue until the section and gob values equal the limits set in step 221.

The larger loop defined by steps 233 and 235 controls the compilation of data over the time interval range specified by the user. Until the time interval index TINTERV reaches the ending time LTIME, the program will reiterate the running sums loop 226-232, after incrementing TINTERV and resetting the cavity values (SECT, GOB). When TINTERV=LTIME, data compilation is complete, and printer 190 is instructed to print the category header (e.g. "SECTION DOWN TIME"), the production quantity CQTY, and the percentage figure $$\left( \frac{CQTY}{TOT} \times 100\% \right).$$

Although the production monitor of the invention has been illustrated in the context of "hot end" ware reject data, this device may be suitably adapted to report production data from the cold end as well. For example, monitor 100 may receive output from cold end mold number readers such as the device of commonly assigned U.S. Pat. No. 4,047,000, and may compile "bottle pack" data such as "bottles into box", "percentage pack by cavity", etc. Furthermore, the production monitor may receive the output of any type of cold end inspection device, to provide a statistical breakdown of defects.

While reference has been made above to specific embodiments, it will be apparent to those skilled in the art that various modifications and alterations may be made thereto without departing from the spirit of the present invention. Therefore, it is intended that the scope of this invention be ascertained by reference to the following claims.

I claim:

1. In an apparatus for producing ware and including a plurality of forming sections; an outfeed conveyor for transporting ware from the forming sections for distribution and inspection; ware rejector means responsive to reject commands for removing unacceptable swab ware and down and stuck ware from the outfeed conveyor; a plurality of switches corresponding respectively to said forming sections for producing swab ware reject signals which designate swab ware to be rejected by said rejector means; and down and stuck detector located adjacent to said outfeed conveyor upstream of said ware rejector means and producing down and stuck reject signals in response to down and stuck ware; the improvement comprising:

reject controller means operatively connected between said switches and said rejector means and between said down and stuck detector and said rejector means for generating said reject commands in response to said swab ware signals and said down and stuck signals, said reject commands being timed with the arrival of the respective unacceptable ware adjacent to said rejector means, communication controller means connected in operative relation with said reject controller means for transmitting a swab ware source signal when ware is rejected on account of swab ware contamination, and a down and stuck source signal when ware is rejected on account of a down and stuck condition, first memory means connected in operative relation with said communication controller means, addressed by said swab ware source signals, and categorized by forming section for tabulating the number of swab ware rejected per forming section during each of a plurality of first intervals, second memory means connected in operative relation with said communication controller means, addressed by said down and stuck source signals and categorized by forming section for tabulating the number of down and stuck ware per forming section during each of said plurality of first intervals, processor means connected in operative relation with said first memory means and said second memory means for tabulating the number of swab ware rejects per forming section over a selected interval encompassing a plurality of said first intervals and the number of down and stuck rejects per forming section over said selected interval, and presentation means connected in operative relation with said processor means for visually presenting the number of swab ware rejects per forming section during said selected interval and the number of down and stuck ware rejects per forming section during said selected interval.

2. An improvement as set forth in claim 1 wherein:
the duration of said selected interval is a plural integral multiple of said first interval, and further comprising input means for operator specification of said selected interval.

3. In an apparatus for producing ware and including a plurality of forming sections; an outfeed conveyor for transporting ware from the forming sections for distribution and inspection; ware rejector means responsive to reject commands for removing unacceptable swab ware and down and stuck ware from the outfeed conveyor; a plurality of switches corresponding respectively to said forming sections for producing swab ware reject signals which designate swab ware to be rejected by said rejector means; a down and stuck detector located adjacent to said outfeed conveyor and outputting down and stuck reject signals in response to down and stuck ware; the improvement comprising:

reject controller means operatively connected between said switches and said rejector means and between said down and stuck detector and said rejector means for generating said reject commands in response to said swab ware signals and said down and stuck signals, said reject commands being timed with the arrival of the respective unacceptable ware adjacent to said rejector means, communication controller means connected in operative relation with said reject controller means for transmitting a swab ware source signal when ware is rejected on account of swab ware contamination, and a down and stuck source signal when ware is rejected on account of a down and stuck condition, first memory means connected in operative relation with said communication controller means for recording each swab ware source signal categorically by forming section and a real time occurring between the formation and rejection of said swab ware, second memory means connected in operative relation with said communication controller means for recording each down and stuck source signal categorically by forming section and a real time occurring between the formation and rejection of said down and stuck ware, processor means connected in operative relation with said first memory means and said second memory means for tabulating the number of swab ware rejects per forming section over a user selected interval and the number of down and stuck rejects per forming section over said user selected interval, and presentation means connected in operative relation with said processor means for visually presenting the number of swab ware rejects per forming section during said user selected interval and the number of down and stuck ware rejects per forming section during said user selected interval.

* * * * *